Sept. 22, 1942.    J. H. RICHARDS    2,296,573
MOUNTING AND DRIVE MEANS FOR MILLING ATTACHMENT
Filed Jan. 28, 1941
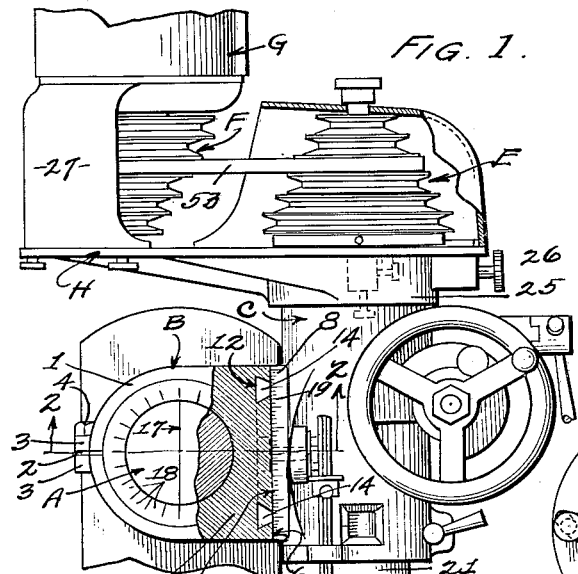
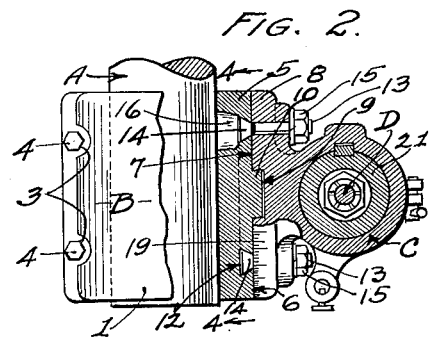
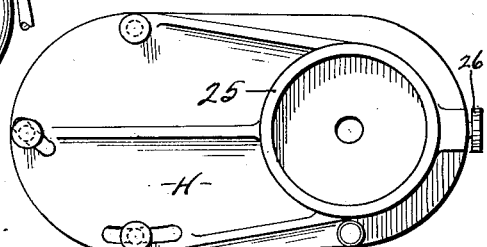
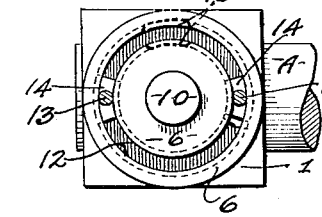
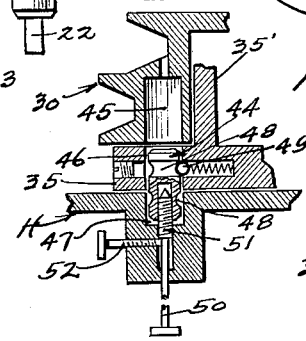
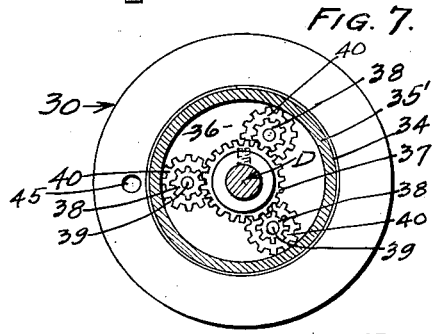
INVENTOR.
JAMES H. RICHARDS Patented Sept. 22, 1942

2,296,573

UNITED STATES PATENT OFFICE 2,296,573

MOUNTING AND DRIVE MEANS FOR MILLING ATTACHMENTS

James H. Richards, Glendale, Calif.

Original application February 16, 1940, Serial No. 319,290. Divided and this application January 28, 1941, Serial No. 376,324

3 Claims. (Cl. 90—17)

This invention relates to mounting and drive means for milling attachments and has for an object the provision, first, of an improved means for detachably and adjustably supporting an all-angle milling attachment, together with its drive means on the overarm of a standard milling machine, with a range of adjustment of 360 degrees about the axis of the overarm as well as longitudinally on the overarm to a substantial extent, whereby the complete attachment may be bodily adjusted while the several elements of the attachment may be individually adjusted.

A secondary object is to provide for said attachment a comprehensive power transmitting mechanism for selectively operating the tool spindle of the attachment at various speeds, including back gearing devices and a motor, all of which elements are embodied in the attachment which is, as aforesaid, supported on the overarm of a milling machine.

An important feature of my invention consists in the provision of a sturdy heavy duty attachment together with improved means for rigidly supporting the attachment for accurate precision work so as to render the attachment effective for practically all of the many operations performed by milling machines, and thereby combining in a single attachment many of the features usually provided in separate devices attachable to a milling machine.

A further object is to provide means for mounting a milling attachment so that it may be bodily disposed and held in an out-of-the-way position when not in use and when the machine is being used for purposes other than those adapted to be performed through the instrumentality of my attachment.

Another object is to provide certain improvements in the form and structure of the tool spindle support and the mounting means therefor in the provision of a closely coupled joint between said mounting and said spindle support so that the entire attachment may be swung about the axis of the overarm and also about an axis at right angles thereto to an extent of 360 degrees in each case in order that the tool may be accurately positioned and supported at any desired angle relative to the work without vibration during the operation of the attachment.

In detail, an object is to provide a mounting for the attachment and a separate support for the tool spindle, which members have engageable flat bearing faces of substantial area for providing a maximum of rigidity, the bearing face on the mounting being spaced from the axis of the overarm on which it is held at a distance not greater than the diameter of said overarm, and the bearing face on said spindle support being spaced from the axis of the tool spindle a distance not greater than the diameter of the spindle support. In addition, one of said bearing faces is provided with an annular reentrant groove concentric with the axis of the overarm and the other bearing face has a plurality of bolts or screws forming attaching members by means of which the mounting and spindle support are clamped together at desired angles, said attaching members having heads interlocked with said groove, and being rotatable in said groove when the attachment is adjusted.

Other objects may appear as the description of my attachment progresses.

I have shown a preferred form of device, subject to modification, within the scope of the appended claims, without departing from the spirit of my invention.

In said drawing:

Fig. 1 is an assembly view of the complete milling attachment mounted on the overarm of a milling machine, the attaching means being partly in section;

Fig. 2 is a section of the same on line 2—2 of Fig. 1;

Fig. 3 is a face view of the bracket by means of which the transmission means is operatively mounted;

Fig. 4 is a face view of the bracket carried by the overarm of the milling machine for adjustably supporting the milling attachment as seen on line 4—4 of Fig. 2;

Fig. 5 is a sectional elevation of the transmission mechanism associated with the tool spindle;

Fig. 6 is an enlarged sectional view of the left hand portion of Fig. 5, showing the selective gear operating mechanism associated with the transmission means; and, Fig. 7 is a sectional view on line 7—7 of Fig. 5.

The improvements shown herein are shown and described in my copending application for patent for All-angle milling machine attachment, filed February 16, 1940, Serial No. 319,290, of which this application is a division.

As shown, my attachment includes means for operatively supporting the attachment on the overarm A of a conventional milling machine, as for instance, a bracket mounting B adapted to be both axially and rotatably adjustable on said overarm, and to such end is provided with a wide sleeve 1 which is radially split at 2 and has opposing lugs 3, 3, which carry bolts 4 by means of which the sleeve may be tightly clamped in a selected position on overarm A, usually with the lugs and bolts at the top, as shown in Fig. 1.

Bracket B has a thick and sturdy body portion 5 formed with a flat bearing face 6 thereon disposed tangentially with respect to the axis of the sleeve and overarm and of substantial area. Said face 6 is adapted to engage a similar face 7 of a spindle support C which is generally circular in cross section, the face 6 being disposed at distance from the axis of the overarm not greater than the diameter of said overarm, and the face 7 being spaced from the axis of a tool spindle D not greater than the diameter of the spindle support C, in order to provide a closely coupled joint between the bracket B and the support C. Face 7 is formed on a circular portion 8 of member C, and the body 5 of member B has a seat 9 in the center thereof which registers with and receives a correspondingly formed boss 10 on face 6 so as to centralize the members B and C, thus providing an axis about which the attachment may be bodily adjusted rotatably on the bearing face 6, for the purpose hereinafter described.

The body 5 of member B has an annular reentrant groove 12 formed therein which is open at the face 6 and is adapted to be adjustably engaged by clamping screws 13 carried by member C and having bevelled heads 14 slidable in said groove, bodies which extend through the portion 8 and nuts 15 externally of said portion 8. Groove 12 has a suitable opening 16 formed therein rearwardly of face 6 through which the heads of screws 13 may be inserted in the groove when the attachment is being assembled.

It may be noted that the end of overarm A is provided with a diametrical line 17 on its end and the outer end of sleeve 1 is provided with a calibrated scale of degrees and fractions thereof, as at 18, adapted to selectively register with the line 17 for micrometrically adjusting the attachment to a desired angle of operation. Similarly the circular peripheries of the body 5 and the portion 8 of member C are similarly calibrated as at 19, respectively, for selectively adjusting the member C bodily about the axis of boss 9 to a desired angle.

Spindle support C is provided with a longitudinally adjustable quill 21 in which is suitably journalled and independently adjustable longitudinally of the tool spindle D for operatively supporting the tool 22, said tool being held in a suitable clutch 23 and the opposite end of the spindle having an extension 24 which is extended through a special driven unit E adapted for connection with a driving unit F associated with a motor G.

Units E, F and G are all supported on member C by means of a bracket H which has a hub 25 telescoping an end of support C, as shown in Fig. 1, and selectively held in position by means of a set screw 26, or otherwise. Member H also has a semicircular portion 27 to which the motor G is suitably attached and on which said motor may be to a certain extent adjustable, this feature not being material to this particular invention.

The power transmission unit E may be enclosed as by means of a case J and includes a series of cone pulleys, as does also the driving unit F, but unit E has a unitary plural grooved member 28 which is fixed to and for rotation with the portion 24 of spindle D by means of a key 29, or otherwise, and an independent pulley member 30 which is selectively connected with the spindle by means of planetary gearing collectively designated at 31 which is disposed internally of the member 30 and is housed in a case 32, as shown in Fig. 5. As shown, pulley member 30 has but two grooves, but may have one or more of such grooves of different diameter, and is provided with a reduced portion 33 which seats in a recess 34 of pulley member 28. Case 32 has a wall 35 adjacent bracket H in which the spindle is journalled and a circular wall 35' which at its outer end is closed by means of a plate 36 suitably attached to the end of said circular wall.

Spindle portion 24 carries a sun gear 37 which is fixed to and for rotation with said spindle and meshes with a plurality of pinions 38 which are held on shafts 39 journalled in the wall 35 of bracket H and plate 36. Said pinions are coaxial with and are suitably fixed to larger gears 40 on shafts 39 which, in turn, mesh with a central gear 41 embracing portion 24 of the spindle and integral with or attached to a flange 42 attached to the reduced portion 33 of pulley member 30 as by means of screws 43.

There is provided by means of said transmission elements, a differential in speed and applied power to the spindle, depending upon whether or not the pulley member 30 is connected with or is operated independently of the pulley member 28, inasmuch as power is applied to the spindle through member 28 in one case and through pulley member 30 in the other case through the planetary gearing unit 31. Hence, means is provided, as shown in Figs. 5 and 6, for selectively rendering the planetary gearing operative for changing the speed and power ratio between the motor and the spindle. The selectiveness of the transmission is accomplished through a suitable shiftable means for changing the speed and power ratio and includes a shiftable clutch member 44 adapted to selectively and slidably seat in whole or in part in a bore 45 of member 30, a bore 46 in wall 35 of case 32 and a bore 47 in bracket H, when said bores or any of them are in registration.

In Fig. 5, I have shown the clutch 44 in position for coupling the member 30 with case 32, while in Fig. 6, it is shown in position for coupling member 35 with bracket H. Member 44 has at least a pair of annular peripheral grooves 48 which are adapted to be engaged by spring loaded detents 49 for holding the clutch in adjusted positions in either case, similar to the manner in which a gear shift rod is held in an automotive transmission. Said clutch is adjusted by means of an adjusting screw 50 which is slidably carried by bracket H and has an enlarged threaded portion 51 adapted to be screwed into and out of the clutch member 44 for longitudinally shifting said clutch member so as to operatively connect or to disconnect the clutch with respect to case 32 and pulley member 30. A set screw 52 is provided for locking the adjusting screw 50 in adjusted position.

Thus, when, as shown in Fig. 1, a belt 53 connects the driving unit F with one of the grooves of pulley member 28, the entire unit E will rotate with the spindle at the speed determined by the particular groove of member 28 in which the belt is operating. When, however, clutch 44 connects case 32 with bracket H power is transmitted through the planetary gearing through case 32 to spindle D at a substantially and necessarily reduced speed and with a corresponding increase of power as compared with any of the speed and power ratios provided by the grooves of pulley member 28.

The mounting and transmission means herein shown and described provides not only a complete bodily adjustment of the assembled attachment on the overarm of a milling machine, both longitudinally of said overarm but to an extent of 360 degrees therearound. Also, the spindle mounting, transmission means and motor are commonly and together adjustable bodily as well as separately with respect to the mounting and to each other, and the driving means disclosed provides a variable speed and power medium from a maximum to a minimum and, selectively, to a subminimum ratio for increasing the power applied to heavy duty work.

What I claim is:

1. A milling attachment of the character described comprising a tool spindle housing attachable to and adjustable on the overarm of a milling machine, a tool spindle rotatable therein, a pulley adapted to be driven by a belt connected to a source of power, a rotatable casing, planetary gears carried by said casing and cooperating with gears on said pulley and said spindle to drive said spindle, and shiftable means for selectively connecting said casing with said pulley or with said housing for changing the speed of said spindle.

2. A milling attachment of the character described comprising a tool spindle housing attachable to and adjustable on the overarm of a milling machine, a tool spindle rotatable therein, a hollow pulley adapted to be driven by a belt connected to a source of power, a casing rotatable in said pulley, planetary gears carried by said casing and cooperating with gears on said pulley and said spindle to drive said spindle, and shiftable means for selectively connecting said casing with said pulley or with said housing for changing the speed of said spindle.

3. In a milling apparatus, a spindle housing, a spindle rotatable therein, a sectional cone pulley on said spindle, means for keying one section of the pulley to the spindle, the other section of said pulley being hollow, a casing rotatable in said hollow section, planetary gearing carried by said casing and cooperating with gears on said hollow section and said spindle to transmit power therebetween, and shiftable means selectively operable for rendering said gearing operative as a change speed means for the spindle or for locking said casing to said pulley to drive said spindle in unison therewith.

JAMES H. RICHARDS.